(12) United States Patent
Redpath

(10) Patent No.: US 9,336,523 B2
(45) Date of Patent: May 10, 2016

(54) MANAGING A SECURE TRANSACTION

(71) Applicant: INTERNATIONAL BUSINESS MACHINES CORPORATION, Armonk, NY (US)

(72) Inventor: Richard Redpath, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/444,519

(22) Filed: Jul. 28, 2014

(65) Prior Publication Data

US 2016/0027015 A1 Jan. 28, 2016

(51) Int. Cl.
*G06Q 20/40* (2012.01)
*G06Q 20/32* (2012.01)
*G06Q 20/20* (2012.01)

(52) U.S. Cl.
CPC .......... *G06Q 20/4012* (2013.01); *G06Q 20/202* (2013.01); *G06Q 20/3278* (2013.01); *G06Q 2220/00* (2013.01)

(58) Field of Classification Search
USPC ................... 235/380, 492; 705/16, 18, 41, 71
See application file for complete search history.

(56) References Cited

U.S. PATENT DOCUMENTS

| | | | |
|---|---|---|---|
| 8,312,288 B2 | 11/2012 | Lupton | |
| 2002/0123972 A1 | 9/2002 | Hodgson | |
| 2007/0022058 A1* | 1/2007 | Labrou et al. | 705/67 |
| 2009/0101720 A1* | 4/2009 | Dewan et al. | 235/492 |
| 2012/0150687 A1* | 6/2012 | Hart | G06Q 30/0613 705/26.41 |
| 2013/0124412 A1 | 5/2013 | Itwaru | |
| 2013/0159196 A1 | 6/2013 | DiZoglio | |
| 2013/0275307 A1* | 10/2013 | Khan | 705/64 |
| 2013/0290119 A1* | 10/2013 | Howe et al. | 705/16 |
| 2014/0046786 A1* | 2/2014 | Mazaheri et al. | 705/18 |
| 2014/0298434 A1* | 10/2014 | Prchal | H04W 4/026 726/7 |
| 2015/0019431 A1* | 1/2015 | Strasding et al. | 705/44 |

FOREIGN PATENT DOCUMENTS

| | | |
|---|---|---|
| EP | 0590861 B1 | 6/1994 |
| EP | 1218865 B1 | 7/2002 |

(Continued)

OTHER PUBLICATIONS

"Apple swipes fingerprint tech off iPhone for now", DW.DE, John Blau, Sep. 13, 2012, found on the world wide web at: http://www.dw.de/apple-swipes-fingerprint-tech-off-iphone-for-now/a-16237281.

(Continued)

*Primary Examiner* — Allyson Trail
(74) *Attorney, Agent, or Firm* — Paul S. Drake

(57) ABSTRACT

A method, system or computer usable program product for secure short range protocol based transaction processing including using a mobile device capable of short range protocol communication to receive a user password; exchanging transaction data between the mobile device and a point of transaction device through a short range protocol communication, the transaction data including a timestamp; using the mobile device, generating a hash including the user password and the timestamp as inputs; providing the hash and the timestamp to an authorization agent; and receiving an authorization from the authorization agent for an account transaction with the point of transaction device based on the password in the hash.

24 Claims, 8 Drawing Sheets

(56) References Cited

FOREIGN PATENT DOCUMENTS

| EP | 2365469 A1 | 9/2011 |
|---|---|---|
| WO | 03083793 A2 | 10/2003 |
| WO | 2006063144 A2 | 6/2006 |

OTHER PUBLICATIONS

"How hackers can steal your debit card info", CNN Money, Jul. 26, 2012, found on the world wide web at: http://money.cnn.com/video/technology/2012/07/26/t-blackhat-atm-hack.cnnmoney/.

"How hackers can unlock your door", CNN Money, Dec. 10, 2013, found on the world wide web at: http://money.cnn.com/video/technology/2013/12/10/t-hackers-unlock-door.cnnmoney/index.html?iid=HP_Taboola.

"Target confirms PIN data was stolen in breach", CNN Money, David Goldman, Dec. 27, 2013, found on the world wide web at: http://money.cnn.com/2013/12/27/technology/target-pin/.

"A First Look at the Target Intrusion, Malware", Krebson Security, Brian Krebs, Jan. 15, 2014, found on the world wide web at: http://krebsonsecurity.com/2014/01/a-first-look-at-the-target-intrusion-malware/.

* cited by examiner

MANAGING A SECURE TRANSACTION

BACKGROUND

1. Technical Field

The present invention relates generally to managing a secure transaction, and in particular, to a computer implemented method for utilizing a user mobile device to securely provide a password for a transaction.

2. Description of Related Art

Consumers utilize credit cards and debit cards to purchase or otherwise acquire goods and services at retailers, on the internet, or in other environments. Several techniques are utilized to maintain the security of such transactions. For example, the user may maintain control over the credit or debit card by swiping the card at a card terminal of a point of sale (POS) terminal. If a personal identification number (PIN) is required, such as with a debit card, the user may enter that PIN through a keypad on the card terminal. In some applications, the clerk manning the POS terminal may request the last four digits of the credit card for manual entry. This helps verify that the credit or debit card is not a clone copy of the magnetic strip of another card.

More recently, mobile phones may be utilized to provide account information through near field communications (NFC) at the card terminal. A variety of techniques are utilized for enabling mobile payments or other transactions worldwide. This includes the user's phone sending a transaction request via a SMS text message to a short code of the mobile phone service provider, which then notifies the merchant of the approved transaction request and applies the transaction to the user's phone account.

SUMMARY

The illustrative embodiments provide a method, system, and computer usable program product for secure short range protocol based transaction processing including using a mobile device capable of short range protocol communication to receive a user password; exchanging transaction data between the mobile device and a point of transaction device through a short range protocol communication, the transaction data including a timestamp; using the mobile device, generating a hash including the user password and the timestamp as inputs; providing the hash and the timestamp to an authorization agent; and receiving an authorization from the authorization agent for an account transaction with the point of transaction device based on the password in the hash.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Processes and devices may be implemented for utilizing a user mobile device to securely provide a password for a transaction. These processes and apparatuses may be implemented and utilized as will be explained with reference to the various embodiments below.

Figure 1:
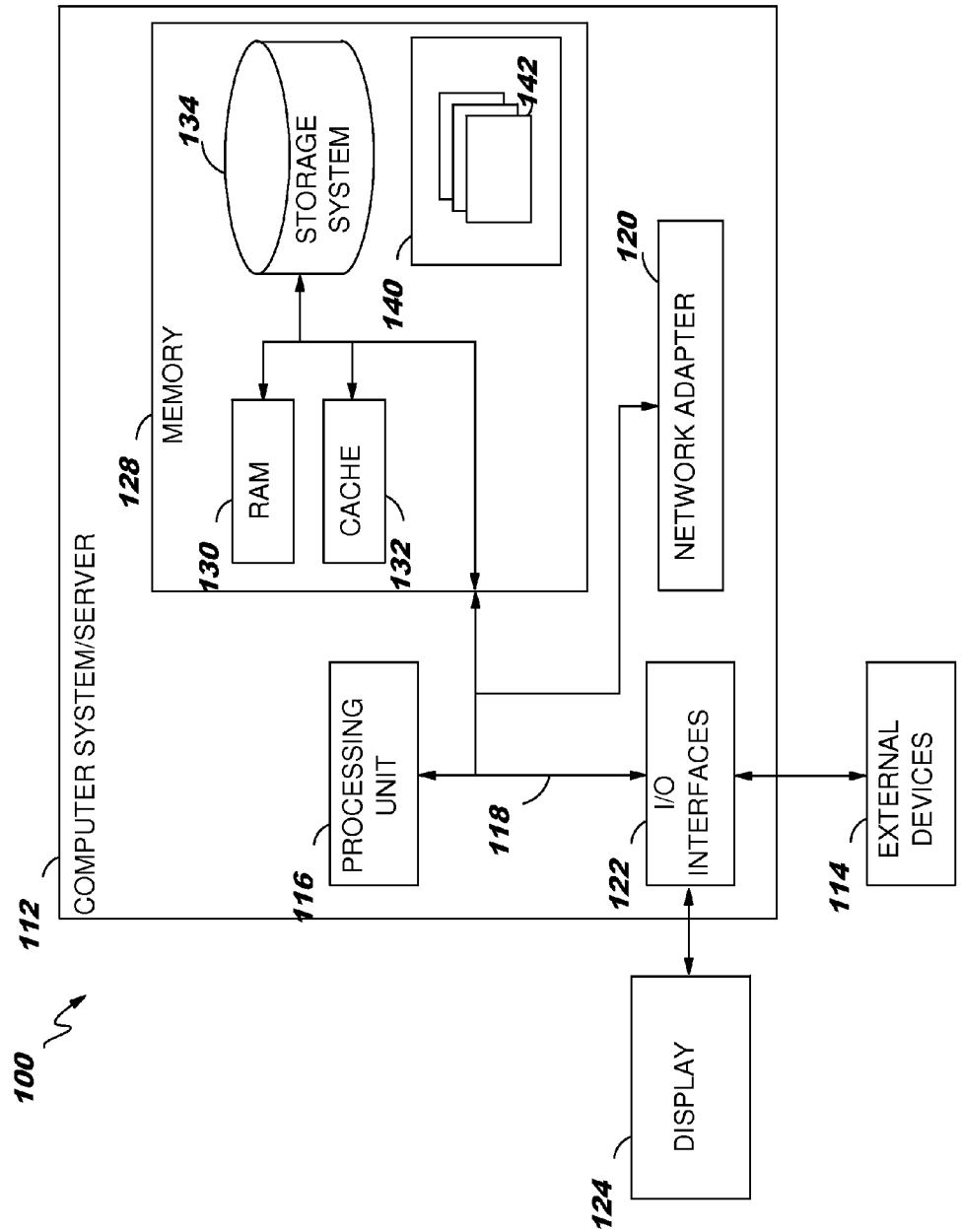
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as utilizing a user mobile device to securely provide a password for a transaction.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for utilizing a user mobile device to securely provide a password for a transaction.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
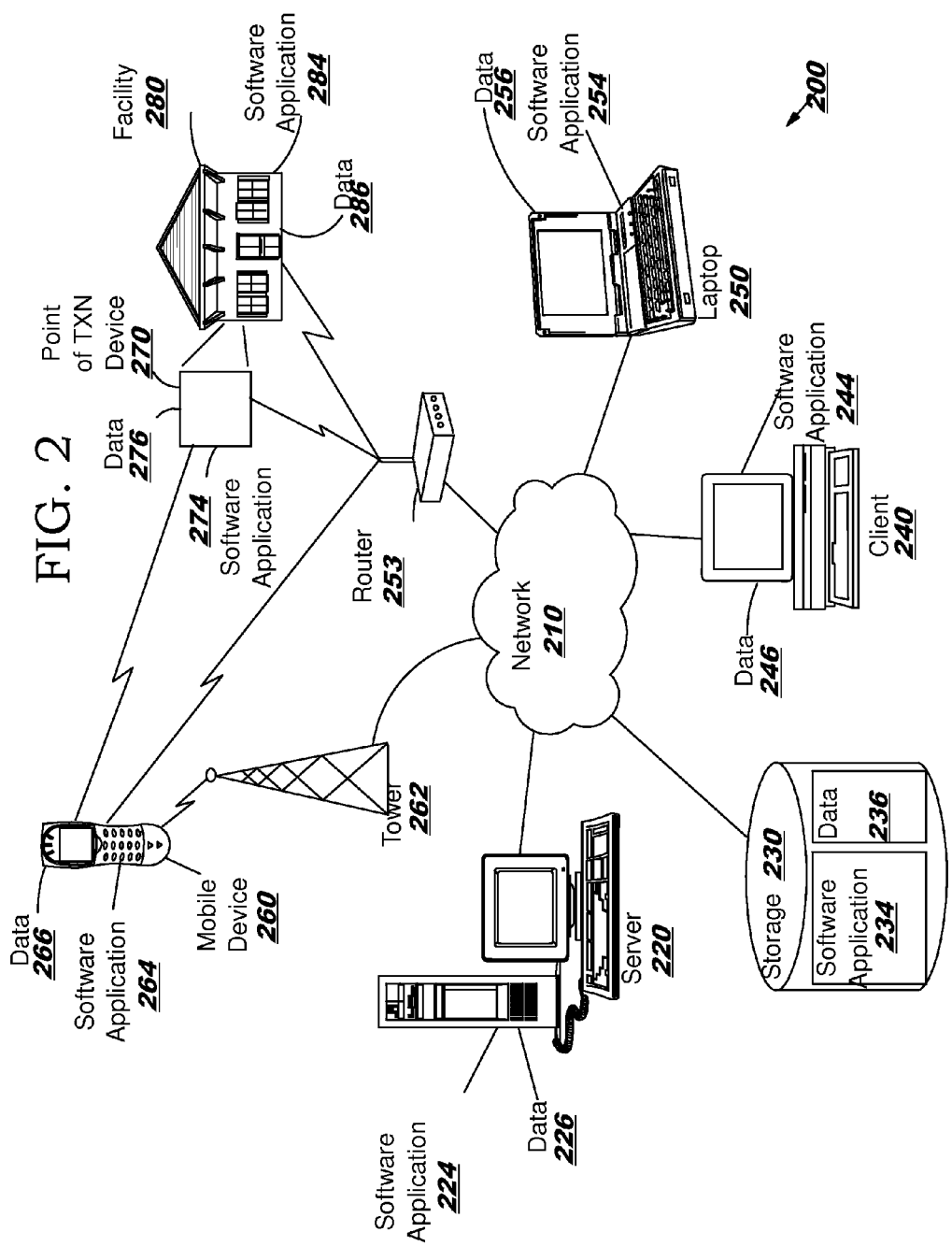
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for utilizing a user mobile device to securely provide a password for a transaction may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220, client 240 and laptop 250 are coupled to network 210 along with storage unit 230. In addition, point of transaction (TXN) device 270 and facility 280 (such as a home or business) are coupled to network 210 including wirelessly such as through a network router 253. A mobile phone 260 may be coupled to network 210 through a mobile phone tower 262. Mobile phone 260 may also be coupled to point of transaction device 270 such as through near field communications or other short range protocol communications. Data processing systems, such as server 220, client 240, laptop 250, mobile phone 260, point of transaction device 270 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for utilizing a user mobile device to securely provide a password for a transaction or other software applications and data in accordance with embodiments described herein. Storage 230 may contain software application 234 and a content source such as data 236 for utilizing a user mobile device to securely provide a password for a transaction. Other software and content may be stored on storage 230 for sharing among various computer or other data processing devices. Client 240 may include software application 244 and data 246. Laptop 250 and mobile phone 260 may also include software applications 254 and 264 and data 256 and 266. Point of transaction device 270 and facility 280 may include software applications 274 and 284 as well as data 276 and 286. Other types of data processing systems coupled to network 210 may also include software applications. Software applications could include a web browser, email, or other software application for utilizing a user mobile device to securely provide a password for a transaction.

Server 220, storage unit 230, client 240, laptop 250, mobile phone 260, point of transaction device 270 and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260, point of transaction device 270 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
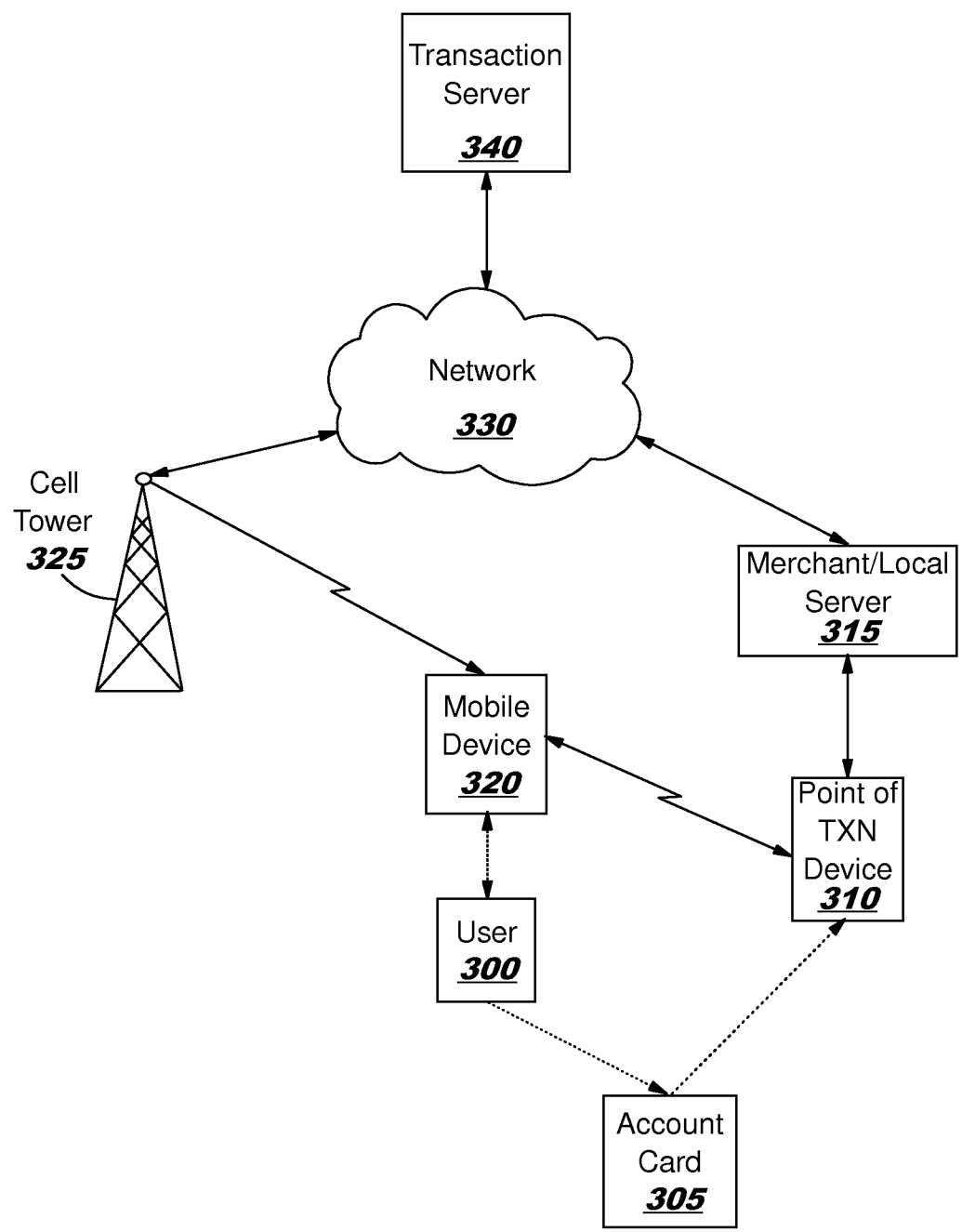
FIG. 3 is a block diagram of devices utilized for a transaction in which various embodiments may be implemented.

FIG. 3 is a block diagram of devices utilized for a transaction in which various embodiments may be implemented. A user 300 can securely perform a transaction with a point of transaction device 310 such as to purchase a product or service. The point of transaction device may be a merchant (e.g., seller or other third party provider) point of sale (POS) device located at a checkout counter at a retail establishment or other merchant location, a vending machine, an automatic teller machine (ATM), and may be built into a checkout counter, the vending machine, a handheld device held by a sales clerk or server, or other type of device. Other types of point of transaction devices can include a home computer or other device owned, rented or possessed by the user that can communicate with a merchant such as across the internet or through other type of network.

User 300 can swipe or otherwise provide identifying and other information from an account card 305 with point of transaction device 310. This transaction data can include a unique account number, name of the user, expiration date of the account card, etc. User 300 can enter a confidential PIN (personal identification number) and other information on a mobile device 320 for generating a hash, a cryptographic hash or message digest, then bring the mobile device 320 in close proximity of point of transaction device 310 to securely transmit the transaction data including the hash and other related information by NFC (near field communication), Bluetooth or other short range protocol communication. For example, an electromagnetic short range protocol communication is wireless (and can be inductive), yet is difficult for a bystander to intercept. Another example of a short range protocol communication is optical whereby a pattern incorporating the hash and other related information is displayed on the mobile device which can be optically scanned by the point of transaction device. A hash is a function used for mapping data, typically from an arbitrary size or length to a fixed size or length. A checksum is a type of hash. A cryptographic hash is a hash function which uses any of a variety of cryptographic techniques to make it difficult for anyone to derive input data from a cryptographically hashed data. A message digest is a cryptographic hash where a private key is utilized in the cryptographic hash. Alternatively, the account card information may be included in the information provided by the mobile device, thereby allowing the user to initiate the transaction with mobile device 320 without swiping account card 305. Other alternatives may be utilized such as described below.

Once point of transaction device 310 receives the transaction data including the account card information, the hash (also referred to herein as a hash or as a message digest) and related information, including any other user provided information, then the point of transaction device 310 or a merchant or local server 315 can combine that information with related transaction information (e.g., transaction amount, seller identifying information, etc.) to generate a transaction request. The transaction request can then be transmitted to a transaction server 340 of an account card entity or other authorization agent. That transmission may be sent through or by local server 315 across a network 330 such as the internet to transaction server 340. Alternatively, the mobile device generated hash and related information may be provided directly to transaction server 340 by mobile device 320 through cellular network 325. Transaction server 340 can then either approve or deny the underlying transaction based on the information provided. That approval or denial is then transmitted to point of transaction device 310 across network 330 and through local server 315. That approval or denial can then be communicated to the user and other persons handling the transaction or directly by the transaction server through the cellular network. Various alternatives can be implemented as described below with reference to the embodiments.

Figure 4A:
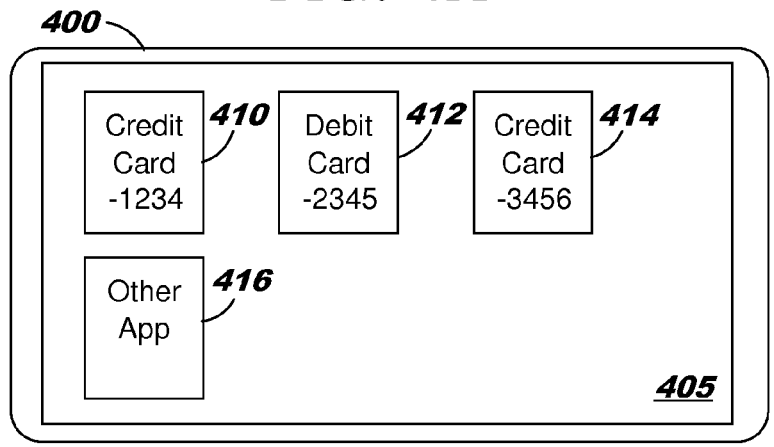
FIGS. 4A-4C are pictorial diagrams of a user interface for a transaction in which various embodiments may be implemented.
Figure 4B:
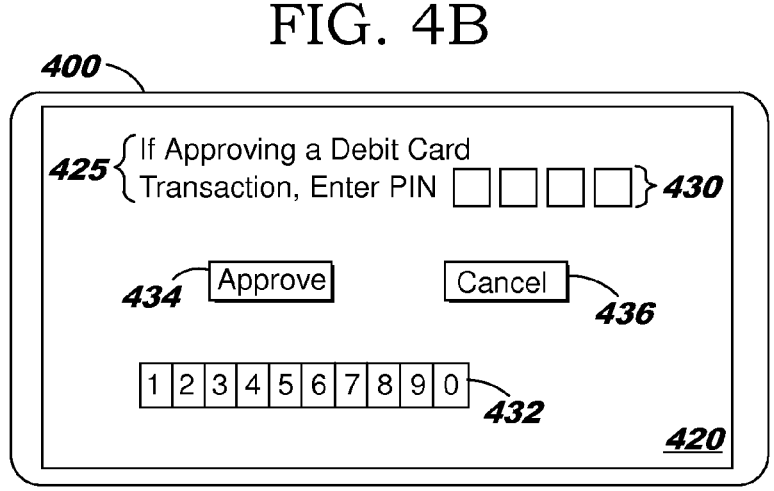
Figure 4C:
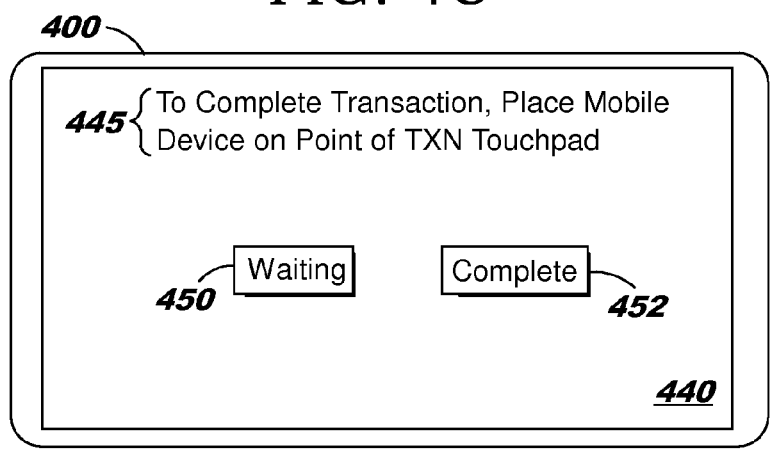

FIGS. 4A through 4C are pictorial diagrams of a user interface for a transaction in which various embodiments may be implemented. In FIG. 4A, a mobile device 400 such as a mobile phone or tablet includes a display 405 showing a variety of applications 410, 412, 414 and 416 which a user can select. These applications have been downloaded onto the mobile device by the user. Each application is provided by an account card issuer or other authorization agent acting on behalf of the account card issuer. In this example, four applications are shown as icons 410 through 416. A first application 410 is for implementing a transaction with a credit card having an account number ending in "1234". A second application 412 is for implementing a transaction with a debit card having an account number ending in "2345". A third application 414 is for implementing a transaction with a credit card having an account number ending in "3456". A fourth application 416 is another application provided on the mobile device which may be unrelated to implementing a transaction. Only the last four digits of a credit or debit card are shown in this example to help prevent other persons from viewing the full account numbers. Additional information may be included on the icon to identify the application or account card such as a logo. The user can select any of these applications such as by pressing or tapping the desired application icon. Alternative embodiments may allow the user to utilize a stylus, a mouse and pointer, voice commands, etc. to select a desired application icon. In this example, the user has selected debit card application 412.

FIG. 4B illustrates the next display 420 of mobile device 400 after debit card application 412 has been selected by the user. Included in display 420 are a set of instructions 425, a PIN display area 430, a PIN entry keypad 432, an approval button 434 and a cancel button 436. If the user is approving a transaction such as an account payment, then the user enters a PIN using keypad 432 then presses approve button 434. The digits of the PIN may be temporarily displayed as entered in PIN display area 430. Once the user presses another PIN number, the previous number is replaced with an asterisk or other symbol or mask to hide the display of that digit. Alternatively, the digit may never be displayed, but an asterisk or other symbol may be displayed as each digit is entered to indicate the number of digits entered by the user. Although four digits are shown, additional or fewer digits may be utilized. The PIN may also include alphabetic letters or special characters. Once the PIN is entered, the user then presses approve or cancel to approve or cancel the transaction. If approve button is selected, then the next display is provided to the user as shown in FIG. 4C. As described above, the user may press the various displayed items or utilize a stylus, a mouse and pointer, voice commands, etc. to enter the PIN digits and select a desired button.

FIG. 4C illustrates the next display 440 of mobile device 400. Display 440 includes an instruction 445 directing the user to place the mobile device near or touching the point of transaction device touchpad used for secure communications. Until this is completed, a Waiting icon 450 is displayed. When completed, a Completed icon 452 is displayed indicating that the mobile device successfully communicated with the point of transaction device. The user should then receive a receipt with any goods purchased. If transaction was not approved, such as may occur with an incorrectly entered PIN, then the user communicates with the point of transaction device or a person manning that device. That may include the user repeating the PIN entry process.

A credit card application may also be utilized to implement the transaction. In such a case, similar information may be displayed to the user and the user may be asked to provide a card validation code (e.g., CVC2, CVV2, CID, etc.) or a passcode to verify the validity of the card used. Many alternative processes may be utilized as will be described below with reference to the various embodiments.

Figure 5:
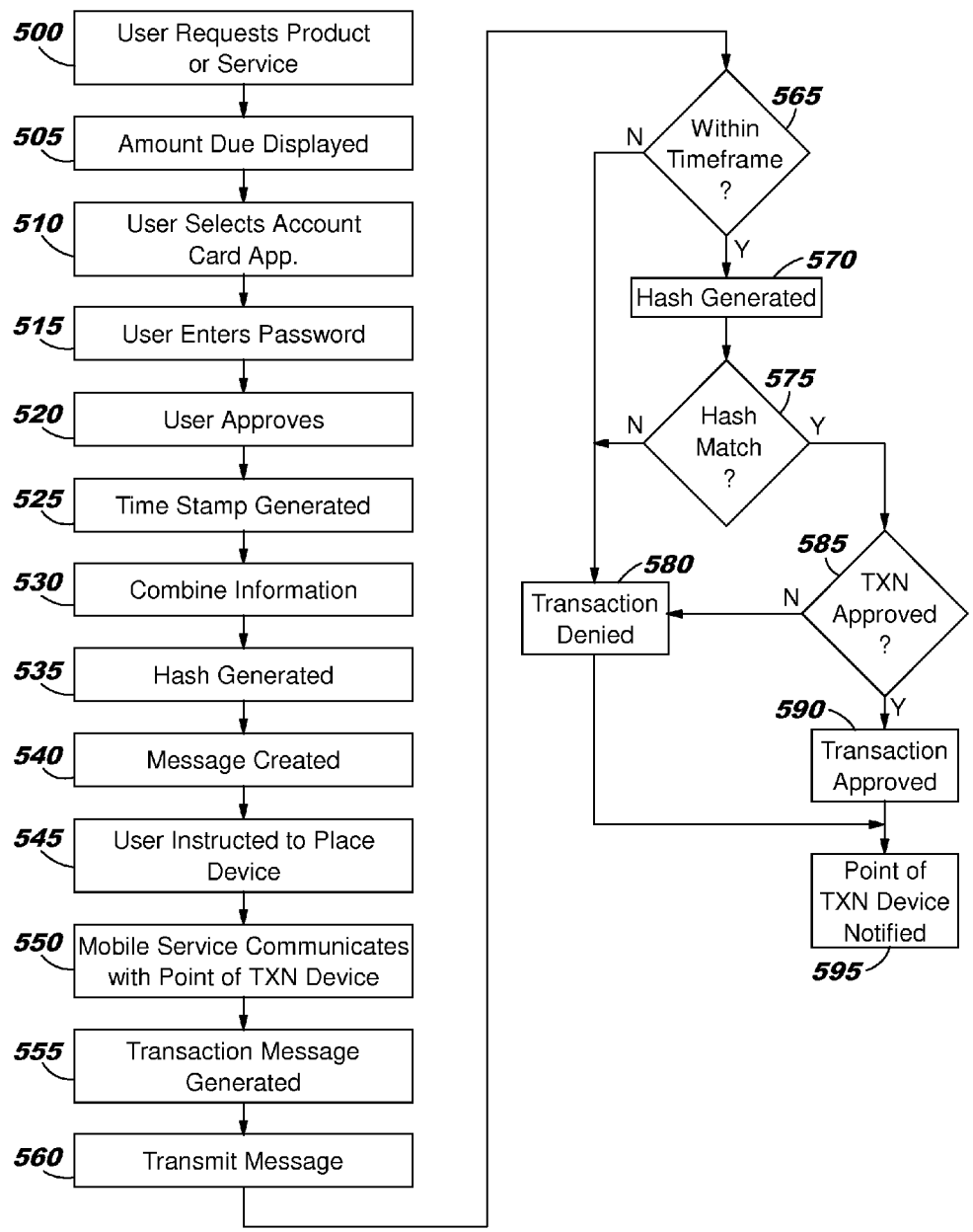
FIG. 5 is a flow diagram of a user approving a transaction in accordance with a first embodiment.

FIG. 5 is a flow diagram of a user approving a transaction in accordance with a first embodiment. In this embodiment, the user is utilizing an account with an institution, such as a credit or debit card, to pay for foods or services. The user securely provides a password through a point of transaction device to verify the identity of the user. The password is provided as part of a cryptographic hash (also referred to herein as a hash or message digest) whereby the password is not discernible from the hash except by the institution. More specifically, the user enters a password on a mobile device for hashing with a timestamp, account number and security information such as embedded data. The timestamp provides a continually changing number so that the hash varies with each use. The password provides information authenticating the user providing that password. Embedded data is information known to the mobile device and the authorization agent of the institution (which may the institution itself) substantially previous to the current transaction (at least a predetermined period of time prior to the current transaction). Embedded data is data other than the password not known to the point of transaction device which provides an additional layer of security. Copies of the embedded data for the user and authorization agent may be established when an application is downloaded onto the user's mobile device. The embedded data can vary for each user and the type of embedded data may also vary for each user. The hash is then communicated with a point of transaction device, which then sends the hash with other transaction information to an account services server for approving the transaction. With this process, the user password is never provided to the point of transaction device except as being securely incorporated in the hash for matching with a hash generated by the account services server, thereby securely protecting the user password from a variety of man in the middle and other attacks.

In a first step 500, the user requests a product or service at a point of transaction device. This can include bringing products from within a brick and mortar store to a check-out counter or paying for a meal at a restaurant. Then in step 505 the point of transaction device then totals the amount due for the transaction and then displays that amount for the user to view. The user then selects an account card such as a debit card to pay the amount on a mobile device in step 510. In an alternative embodiment, the user may swipe a physical account card in the point of transaction device, but in this embodiment the physical account card is not required. Then in step 515, the user enters a PIN or other user password for that account card into the mobile device. When the password is entered, then user then presses an approve button in step 520.

The mobile device then generates a timestamp in step 525. That timestamp is then combined with the user password, the card account number, and other security information in step 530. The other security information is embedded data which can include information known by the account card issuer and the user's mobile device such as the user's zip code, last name, mother's maiden name, etc. The choice of which security information or other embedded data to include in the hash may differ for each user as a security measure. That is, if the same type of security information is utilized in generating the hash for every user, then it may be easier for a third party to identify that security information about the user for reverse engineering the hash. The other security information can also include security information embedded in the application by the account card issuer such as a previously assigned serial number or even a random number generated based on an algorithm and seed code known only to the account card issuer and implemented on the user's mobile device. Then in step 535, a hash is created from the time stamp, the password, the card account number, and the other security information. In step 540, an approval message is created including transaction data such as the card account number, the time stamp, and the hash. Then in step 545, the user is instructed to place the mobile device on the point of transaction device touch pad for establishing a secure communication link (e.g., NFC or other short range protocol communication) with the point of transaction device. In step 550, the mobile device communicates that message to the point of transaction device once a secure communication link is established.

In step 555, the point of transaction device generates a transaction message by combining the information in the approval message from the mobile device with the amount of the transaction, a merchant identifier identifying the seller of the product or service as well as any other applicable information to complete the transaction. A similar hash may be created and appended to the transaction message by the point of transaction device for enabling verification of the transaction message by the institution. Then in step 560, the transaction message is transmitted to a transaction server for approval. A local server may generate the transaction message on behalf of the point of transaction device based on information gathered by the point of transaction device depending on the configuration of the merchant's operations.

In step 565, the transaction server compares the timestamp to the current time and to prior timestamps for this account. If there is a significant difference (e.g., greater than 2 minutes) or if the timestamp has been used before for this account, then processing continues to step 580 to reject the transaction, otherwise processing continues to step 570. This rejection of old transaction messages helps prevent the reuse of a user hash in another later transaction, thereby providing greater security. In step 570, the transaction server then utilizes the timestamp and the account number included in the transaction message with security information not included in the message to generate a comparable hash. That is, security information used to generate the hash (e.g., the card account number, the user password, account holder last name and zip code, previously assigned serial number, etc.) is obtained from server memory and utilized to generate the comparable hash. In step 575, the hash received in the transaction message is compared to the hash generated by the transaction server. If they do not match, then the transaction is denied and that is communicated with the point of transaction device in step 580. If they do match in step 575, then other information is utilized in step 585 to determine whether the transaction is approved such as whether the account card has enough credit remaining. If not, then processing continues to step 580 where the transaction is denied. If the transaction is approved, then in step 590, that approval is communicated with the point of transaction device.

In step 595, the point of transaction device then notifies the approval or denial of the financial transaction with the user of the mobile device. Obviously, if approved, the user may then obtain a receipt and the purchased goods or services. Otherwise, the user may start the process again with the same account card (e.g., if the password was incorrectly entered), a different account card, or with cash.

Figure 6:
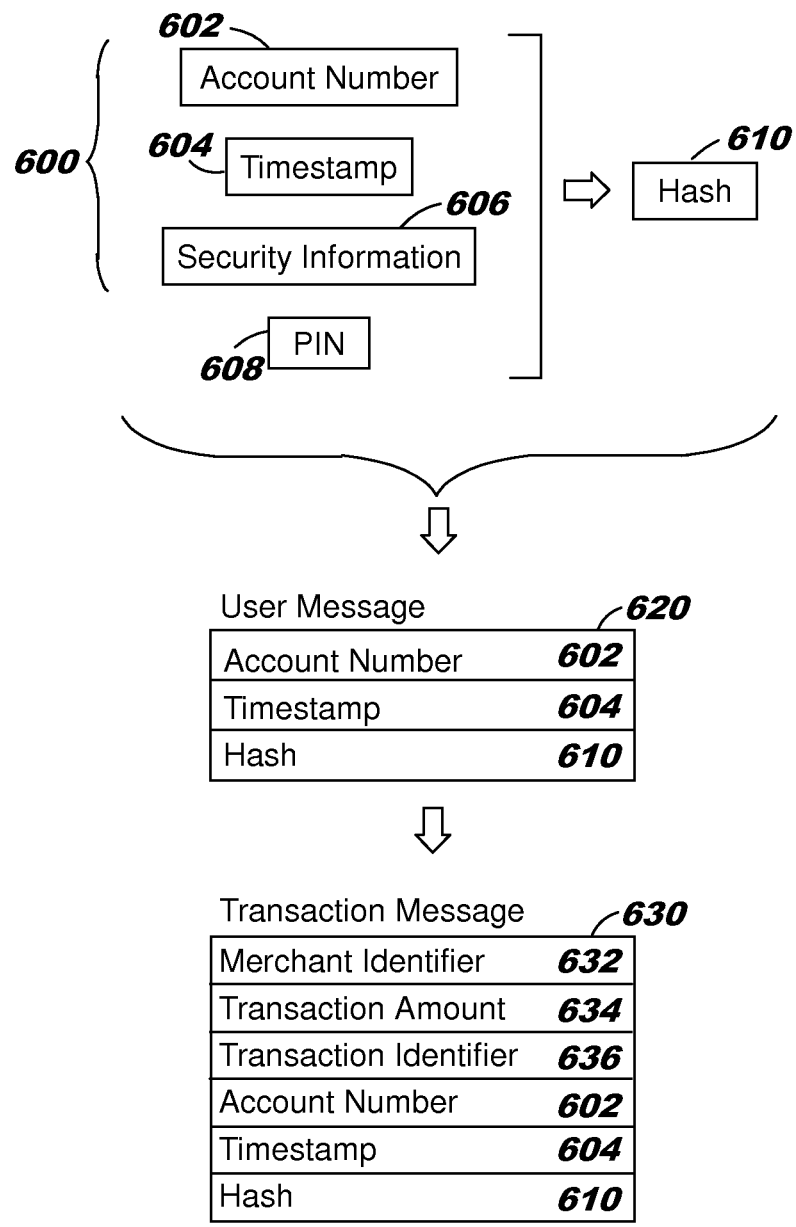
FIG. 6 is a flow diagram of data elements and messages generated and transmitted in accordance with the first embodiment.

FIG. 6 is a flow diagram of data elements and messages generated and transmitted in accordance with the first embodiment. Several data items 600 are gathered by an application running on a mobile device including a card account number 602, mobile device timestamp 604, and a variety of other security information 606 (e.g., user's zip code, last name, mother's maiden name, serial number, a security key, etc.). These security information data items are known to the mobile device and an institution which provides credit or debit services for the card account. The exact set of security information data items may differ by user and/or account number. A user password 608 such as a PIN is provided by the user (i.e., entered in the mobile device keypad or retrieved from memory with user approval). The data items are then utilized by a hash function to generate a cryptographic hash 610 (also referred to herein as a hash or message digest). A variety of hash functions known in the art may be utilized to generate the hash.

Hash 610 is then combined with account number 602 and timestamp 604 by the mobile device to generate transaction data in a user message 620. The account number is included for several reasons including notifying the merchant and the institution as to what account should be credited or debited. The time stamp is included as it is part of the hash and is not known to the institution server. The institution server would need this information to reconstruct the hash. Also, the timestamp provides a mechanism for the institution server to verify that the transaction is recent and that the hash is not being reused. The password and other embedded data are not included in the message. The transaction server already has this information and the lack of this information in the message helps protect the transaction from man in the middle and other types of attacks.

The user message is sent from the mobile device to the point of transaction device, typically through a NFC communication, although alternative short range protocol communications could be utilized such as optical. The data elements of the user message are then incorporated into a transaction message 630 including a merchant identifier 632, a transaction amount 634 and a transaction identifier 636. This may be performed by the point of transaction device or a local server or merchant server. The merchant identifier identifies the entity to receive the funds from the credit or debit transaction, the transaction amount provides the amount to be credited or debited, and the transaction identifier is utilized to refer back to the transaction if needed or as an identifier which may appear on the user's account log. Additional information may be incorporated in the transaction message such as a point of transaction device timestamp. Alternative embodiments may also utilize a similar hash process for communications between the merchant and the institution.

The transaction message is then sent to the authorization agent, which may be the institution which provided the credit or debit card account to the user. The institution then generates a hash for the account number provided utilizing the mobile device timestamp provided. If the timestamp is recent and if the hash generated by the institution matches the hash provided in the transaction message, then the user password is verified. The transaction can then be reviewed and approved if it meets the standard requirements of the credit or debit card (e.g., sufficient credit or funds for the transaction).

Figure 7:
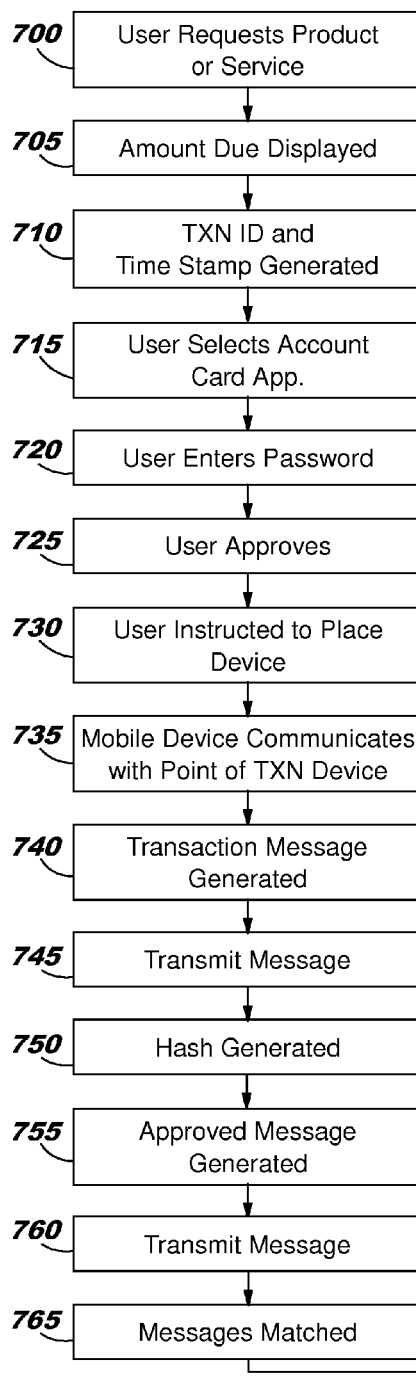
FIG. 7 is a flow diagram of a user approving a transaction in accordance with a second embodiment.
Figure 7:
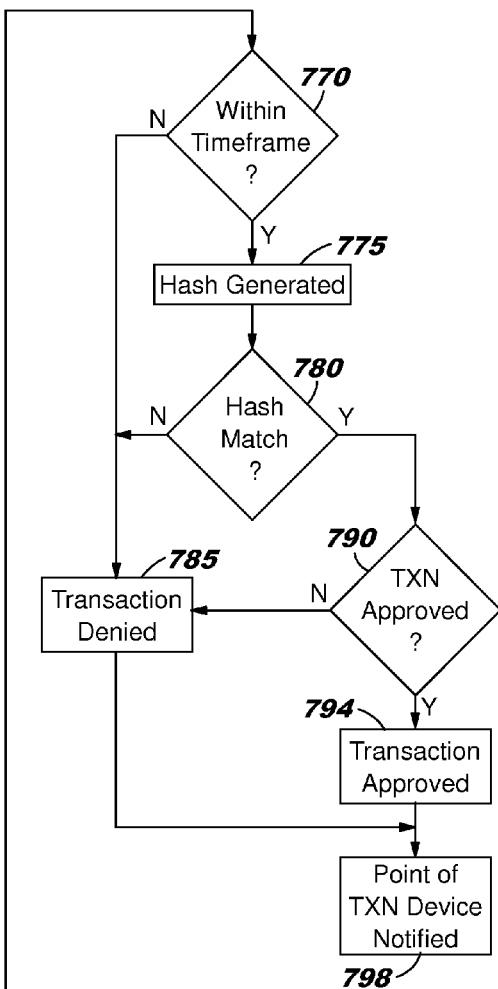

FIG. 7 is a flow diagram of a user approving a transaction in accordance with a second embodiment. In this embodiment, the user is utilizing an account with an institution, such as a credit or debit card, to pay for foods or services. The point of transaction device receives the user's card account number from the user's mobile device. A transaction message is generated by the point of transaction device and is then sent to a server for the institution for approval of the transaction. The user's mobile device obtains the transaction amount, a transaction ID and a timestamp from the point of transaction device. The mobile device then generates a cryptographic hash (also referred to herein as a hash or message digest) using a password entered by the user along with information from the point of transaction device such as the timestamp and security information such as embedded data stored in the mobile device. The timestamp provides a continually changing number so that the hash varies with each use. The password provides information authenticating the user providing that password. The embedded data provides information known to the mobile device and the authorization agent of the institution (which may be the institution itself). Embedded data is data other than the password not known to the point of transaction device which provides an additional layer of security. An approval message is generated by the mobile device including the hash and security information such as other embedded data. The approval message is then sent to the institution server. The institution server then matches the transaction message and the approval message. Based on a valid hash and other information, the institution can then approve (or not approve) the transaction. With this process, the user password is never provided to the point of transaction device, thereby securely protecting the user password from a variety of man in the middle and other attacks.

In a first step 700, the user requests a product or service at a point of transaction device such as a point of sale (POS) device. This can include bringing products from within a brick and mortar store to a check-out counter or paying for a meal at a restaurant. Then in step 705 the point of transaction device then totals the amount due for the transaction and then displays that amount for the user to view. Then in step 710, the point of transaction device generates a transaction identifier (ID) and timestamp for the transaction.

The user then selects an account card such as a debit card to pay the amount on a mobile device in step 715. Then in step 720, the user enters a PIN or other user password for that account card into the mobile device. The transaction amount may also be entered manually as a double check at this point in the process. When the password is entered, then user then presses an approve button in step 725. In this embodiment, no hash is generated by the mobile device at this point. Alternatively, the user password may be entered later in this process when the hash is generated. Then in step 730, the user is instructed to place the mobile device on the point of transaction device touch pad for establishing a secure communication link (e.g., NFC or other short range protocol communications) with the point of transaction device. In step 735, the mobile device communicates transaction data including the card account number to the point of transaction device once a secure communication link is established. In an alternative embodiment, the user may swipe a physical account card in the point of transaction device, but in this embodiment the physical account card is not required. The mobile device also receives the transaction ID, the transaction amount, and the point of transaction timestamp from the point of transaction device during this secure communication link. Additional information may also be received such as a merchant identifier.

In step 740, the point of transaction device generates a transaction message by combining the account information in the communication from the mobile device with the transaction ID, the amount of the transaction (e.g., a sales price), the point of transaction timestamp, a merchant identifier identifying the seller of the product or service, as well as any other applicable information to complete the transaction. A point of transaction device hash may be created and appended to the transaction message by the point of transaction device for enabling verification of the transaction message by the institution. Then in step 745, the transaction message is transmitted to a transaction server for approval. A local server may generate the transaction message on behalf of the point of transaction device based on information gathered by the point of transaction device depending on the configuration of the merchant's operations.

The mobile device then generates a hash in step 750. In this embodiment, the hash includes the user password or PIN, the card account number, the transaction ID, the transaction amount, and the point of transaction timestamp. A mobile device timestamp may also be generated and utilized as well as other security information. The other security information can include embedded data known by the account card issuer and the user's mobile device such as the user's zip code, last name, mother's maiden name, etc. The choice of which security information to include in the hash may differ for each user as a security measure. That is, if the same type of security information is utilized in generating the hash for every user, then it may be easier for a third party to identify that security information about the user for reverse engineering the hash. The other security information can also include security information embedded in the application by the account card issuer such as a previously assigned serial number or even a random number generated based on an algorithm and seed code known only to the account card issuer and implemented on the user's mobile device.

Then in step 755, an approval message is created including the card account number, the transaction ID, the transaction amount, the point of transaction timestamp, and the hash. Other information may be included. In step 760, the mobile device sends the approval message to the transaction server, such as through a cellular network, rather than through the point of transaction device. As a result, the point of transaction device or the merchant server may never have access to the mobile device hash, thereby providing even greater security.

In step 765, the transaction server matches the transaction message from the point of transaction device with the approval message from the mobile device based on the card account number and the transaction identifier as well as other information such as the point of transaction device timestamp and the transaction amount. The in step 770, the transaction server compares the point of transaction device timestamp to the current time and to prior timestamps for this account. If there is a significant difference (e.g., greater than 2 minutes) or if the timestamp has been used before for this account, then processing continues to step 785 to reject the transaction, otherwise processing continues to step 775. This rejection of old transaction messages helps prevent the reuse of a user hash in another later transaction, thereby providing greater security. In step 775, the transaction server then utilizes the point of transaction device timestamp and the card account number, included in either or both the approval message and the transaction message, with security information not included in the message to generate a comparable hash. That is, security information used to generate the hash (e.g., the card account number, the user password, account holder last name and zip code, previously assigned serial number, etc.) is obtained from server memory and utilized to generate the comparable hash. In step 780, the hash received in the approval message is compared to the hash generated by the transaction server. If they do not match, then the transaction is denied and that is communicated with the point of transaction device in step 785. If they do match in step 780, then other information is utilized in step 790 to determine whether the transaction is approved such as whether the account card has enough credit remaining. If not, then processing continues to step 785 where the transaction is denied. If the transaction is approved, then in step 794, that approval is communicated with the point of transaction device. That approval may also be sent directly to the user through the mobile device.

In step 798, the point of transaction device then communicates the approval or denial of the transaction with the user of the mobile device. Obviously, if approved, the user may then obtain a receipt and the purchased goods or services. Otherwise, the user may start the process again with the same account card (e.g., if the password was incorrectly entered), a different account card, or with cash.

Figure 8:
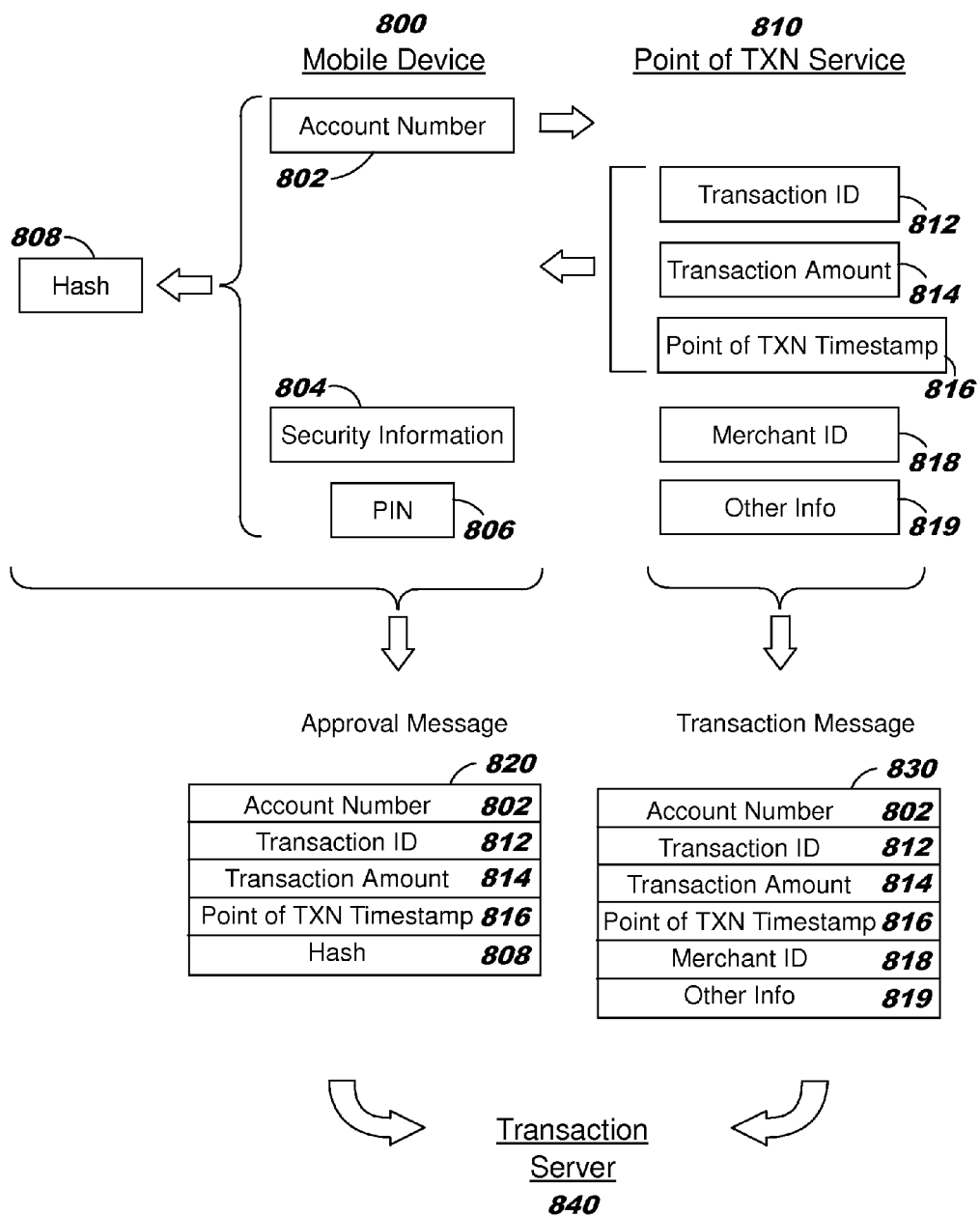
FIG. 8 is a flow diagram of data elements and messages generated and transmitted in accordance with the second embodiment.

FIG. 8 is a flow diagram of data elements and messages generated and transmitted in accordance with the first embodiment. Several data items are gathered by an application running on a mobile device 800 including a card account number 802 and a variety of other security information 804 (e.g., user's zip code, last name, mother's maiden name, serial number, a security key, etc.). These security information data items 804 are known to the mobile device and an institution which provides credit or debit services for the card account. The exact set of security information data items may differ by user and/or account number. A user password 806 such as a PIN is provided by the user (i.e., entered in the mobile device keypad or retrieved from memory with user approval). Other information such as a transaction ID 812, transaction amount 814 and point of transaction timestamp 816 are obtained from the point of transaction device 810 in a secure communication. These data items are then utilized by a hash function to generate a cryptographic hash 808 (also referred to herein as a hash or a message digest). A variety of hash functions known in the art may be utilized to generate the hash.

Hash 808 is then combined with account number 802, transaction ID 812, transaction amount (e.g., sales price) 814, and point of transaction timestamp 816 by the mobile device to generate an approval message 820. The account number is included for several reasons including notifying the institution as to what account should be credited or debited. The transaction ID, transaction amount and point of transaction time stamp are included as they are part of the hash, are used for matching messages as described below, and not previously known to the institution server. The institution server would also need this information to reconstruct the hash. Also, the point of transaction timestamp provides a mechanism for the institution server to verify that the transaction is recent and that the hash is not being reused. The password and other embedded data are not included in the message. The transaction server already has this information and the lack of this information in the message helps protect the transaction from man in the middle and other types of attacks. The approval message is then sent from the mobile device to the transaction server or other authorization agent, typically through a cellular or Wi-Fi communication, although alternative communications could be utilized such as optical.

Several data items are gathered by an application running on a point of transaction device 810 processing a transaction, such as a sale of goods or services, including a transactional ID 812, a transaction amount (e.g., sales price) 814, a point of transaction timestamp 816, a merchant ID 818 and other information 819. Additional information such as an account number 802 is obtained from the mobile device in a secure communication. These data elements are then incorporated into a transaction message 830 including an account number 802, a transaction ID 812, a transaction amount 814, a point of transaction timestamp 816, a merchant ID 818 and other information 819. This may be performed by the point of transaction device or a local server or merchant server. The merchant identifier identifies the entity to receive the funds from the credit or debit transaction, the transaction amount provides the amount to be credited or debited, and the transaction identifier is utilized to refer back to the transaction if needed or as an identifier which may appear on the user's account log. Additional information may be incorporated in the transaction message such as a point of transaction device hash. Alternative embodiments may also utilize a similar hash process for communications between the merchant and the institution.

The transaction message 830 is then sent to an authorization agent transaction server 840, which may be the institution which provided the credit or debit card account to the user. The transaction server then matches the user approval message with the transaction message. Once matched, the transaction server generates a hash for the account number provided utilizing the information provided. If the timestamp is recent and if the hash generated by the transaction server matches the hash provided in the approval message, then the user password is verified. The transaction can then be reviewed and approved if it meets the standard requirements of the credit or debit card (e.g., sufficient credit or funds for the transaction).

Alternative embodiments may include a variety of alternative methods of implementing the present invention by one of ordinary skill in the art. For example, different types of information may be utilized in the transaction and approval messages. The point of transaction device may be a home computer where the user is making a purchase on the internet.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for utilizing a user mobile device to securely provide a password for a transaction. A client data processing system may download that computer usable code, such as for storing on a data storage medium associated with the client data processing system, or for using in the client data processing system.

The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for secure short range protocol communication based transaction processing comprising:
   using a mobile device capable of short range protocol communication and capable of receiving a user password and for storing embedded data communicated with an authorization agent substantially previous to the communication based transaction;
   exchanging transaction data between the mobile device and a point of transaction device through a short range protocol communication, the transaction data including a timestamp;

using the mobile device, generating a hash including the user password, embedded data, and the timestamp as inputs;

providing the hash and the timestamp to the authorization agent for deriving the password and embedded data from the hash using the timestamp; and receiving an authorization from the authorization agent for an account transaction with the point of transaction device based on the password and embedded data derived from the hash.

2. The method of claim 1 further comprising using the mobile device to provide an account number to the point of transaction device as transaction data in the short range protocol communication wherein the account number is also provided to the authorization agent with the hash and timestamp.

3. The method of claim 2 wherein the authorization from the authorization agent is also based on the timestamp being within a predetermined period of time from the time the hash and timestamp are provided to the authorization agent.

4. The method of claim 3 further comprising providing the transaction amount to the authorization agent wherein the authorization is limited to the transaction amount.

5. The method of claim 2 further comprising:
receiving the hash by the authorization agent;
obtaining the PIN number and embedded data from the hash;
verifying the PIN number and embedded data from stored account holder data;
verifying that the timestamp is received within a predetermined time period; and
authorizing the transaction by the authorization agent.

6. The method of claim 1 further comprising using the mobile device to provide the hash and timestamp to the authorization agent through the point of transaction device as transaction data in the short range protocol communication.

7. The method of claim 6 further comprising using the mobile device to provide an account number to the point of transaction device as transaction data in the short range protocol communication; and providing the transaction amount to the authorization agent; wherein the account number is also provided to the authorization agent with the hash and timestamp; wherein the authorization from the authorization agent is also based on the timestamp being within a predetermined period of time from the time the hash and timestamp are provided to the authorization agent; and wherein the authorization is limited to the transaction amount.

8. The method of claim 1 further comprising using the mobile device to provide the hash and timestamp to the authorization agent through a second communication other than the short range protocol communication wherein the second communication is not through the point of transaction device.

9. The method of claim 8 wherein the timestamp is received from the point of transaction device as transaction data in the short range protocol communication.

10. A computer program product for secure short range protocol communication based transaction processing, the computer program product comprising a computer readable storage medium having program instructions embodied therewith, the program instructions executable by a processing circuit to cause the device to perform a method comprising:
using a mobile device capable of short range protocol communication and capable of receiving a user password and for storing embedded data communicated with an authorization agent substantially previous to the communication based transaction;
exchanging transaction data between the mobile device and a point of transaction device through a short range protocol communication, the transaction data including a timestamp;
using the mobile device, generating a hash including the user password, embedded data, and the timestamp as inputs;
providing the hash and the timestamp to the authorization agent for deriving the password and embedded data from the hash using the timestamp; and
receiving an authorization from the authorization agent for an account transaction with the point of transaction device based on the password and embedded data derived from the hash.

11. The computer program product of claim 10 further comprising using the mobile device to provide an account number to the point of transaction device as transaction data in the short range protocol communication wherein the account number is also provided to the authorization agent with the hash and timestamp.

12. The computer program product of claim 11 wherein the authorization from the authorization agent is also based on the timestamp being within a predetermined period of time from the time the hash and timestamp are provided to the authorization agent.

13. The computer program product of claim 10 further comprising using the mobile device to provide the hash and timestamp to the authorization agent through the point of transaction device as transaction data in the short range protocol communication.

14. The computer program product of claim 10 further comprising using the mobile device to provide the hash and timestamp to the authorization agent through a second communication other than the short range protocol communication wherein the second communication is not through the point of transaction device.

15. The computer program product of claim 14 wherein the timestamp is received from the point of transaction device as transaction data in the short range protocol communication.

16. A data processing system for secure short range protocol communication based transaction processing, the data processing system comprising:
a processor; and
a memory storing program instructions which when executed by the processor execute the steps of:
using a mobile device capable of short range protocol communication and capable of receiving a user password and for storing embedded data communicated with an authorization agent substantially previous to the communication based transaction;
exchanging transaction data between the mobile device and a point of transaction device through a short range protocol communication, the transaction data including a timestamp;
using the mobile device, generating a hash including the user password, embedded data, and the timestamp as inputs;
providing the hash and the timestamp to the authorization agent for deriving the password and embedded data from the hash using the timestamp; and
receiving an authorization from the authorization agent for an account transaction with the point of transaction device based on the password and embedded data derived from the hash.

17. The data processing system of claim 16 further comprising using the mobile device to provide an account number to the point of transaction device as transaction data in the short range protocol communication wherein the account number is also provided to the authorization agent with the hash and timestamp.

18. The data processing system of claim 17 wherein the authorization from the authorization agent is also based on the timestamp being within a predetermined period of time from the time the hash and timestamp are provided to the authorization agent.

19. The data processing system of claim 16 further comprising using the mobile device to provide the hash and timestamp to the authorization agent through the point of transaction device as transaction data in the short range protocol communication.

20. The data processing system of claim 16 further comprising using the mobile device to provide the hash and timestamp to the authorization agent through a second communication other than the short range protocol communication wherein the second communication is not through the point of transaction device.

21. A method of an authorization agent authenticating a user for a transaction comprising:

receiving a hash from a mobile device, the hash generated using a user password, embedded data communicated between the authorization agent and mobile device for storage on the mobile device substantially previous to the transaction, and a timestamp as inputs;

receiving a request for authorizing an account transaction from a point of transaction device, the request including the timestamp;

deriving the user password and embedded data from the hash using the timestamp;

determining whether the derived user password and embedded data is authentic; and upon a positive determination, providing an authorization for an account transaction to the point of transaction device.

22. The method of claim 21 wherein the hash received from the mobile device was generated using a first copy of the embedded data as one of the inputs; wherein deriving the user password from the hash includes using a second copy of the embedded data; wherein the embedded data is not known to the point of transaction device; and wherein the hash is provided in the request from the point of transaction device, which received the hash from the mobile device as transaction data in a short range communication.

23. The method of claim 22 further comprising receiving a user account number in the request from the point of transaction device; wherein the point of transaction device received the user account number from the mobile device as transaction data in the short range communication.

24. The method of claim 21 wherein the authorization from the authorization agent is also based on the timestamp being within a predetermined period of time from the time the hash and timestamp are provided to the authorization agent.

* * * * *